US008886980B2

(12) United States Patent
Kulik

(10) Patent No.: US 8,886,980 B2
(45) Date of Patent: Nov. 11, 2014

(54) POWER EFFICIENT WAY OF OPERATING MOTION SENSORS

(75) Inventor: Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 881 days.

(21) Appl. No.: 13/073,621

(22) Filed: Mar. 28, 2011

(65) Prior Publication Data

US 2011/0239026 A1 Sep. 29, 2011

Related U.S. Application Data

(60) Provisional application No. 61/318,746, filed on Mar. 29, 2010.

(51) Int. Cl.
- *G06F 1/32* (2006.01)
- *G01C 21/16* (2006.01)
- *G01C 19/00* (2013.01)

(52) U.S. Cl.
CPC ............ *G01C 21/165* (2013.01); *G06F 1/3287* (2013.01); *G01C 19/00* (2013.01)
USPC ........... 713/323; 713/320; 713/324; 702/141; 702/150; 702/151

(58) Field of Classification Search
CPC ........ G01C 19/00; G01C 19/42; G01C 19/44; G01C 21/16; G01P 7/00; G01P 13/00; G01P 15/00; G01P 15/14; G01P 15/18; G01P 15/003; G01P 15/08; G01P 15/105; G01P 2015/08
USPC .......... 713/320, 323, 324; 702/141, 150, 151; 341/20
See application file for complete search history.

(56) References Cited

U.S. PATENT DOCUMENTS

| 7,672,781 B2 | 3/2010 | Churchill et al. |
| 2003/0085870 A1 | 5/2003 | Hinckley |

(Continued)

FOREIGN PATENT DOCUMENTS

| DE | 102007062705 A1 | 7/2009 |
| EP | 1760431 A1 | 3/2007 |

(Continued)

OTHER PUBLICATIONS

International Search Report and Written Opinion—PCT/US2011/030391—ISA/EPO—Oct. 26, 2011.

*Primary Examiner* — Glenn A Auve
(74) *Attorney, Agent, or Firm* — Shyam K. Parekh; Michael Johnson

(57) ABSTRACT

Systems and methods are described for operating motion sensors in a power-efficient manner. An example technique described herein includes obtaining, at a motion sensor, first indications of sensed motion of a device associated with the motion sensor; integrating, at the motion sensor, the first indications of the sensed motion to obtain integrated motion information; generating, at the motion sensor, second indications of the integrated motion information; and sampling, at a processor disparate from the motion sensor, selective ones of the second indications. Another example technique includes obtaining a first indication of a motion state anomaly associated with motion of a mobile device and causing a gyroscope associated with the mobile device to transition between a first operating mode and a second operating mode in response to the first indication, where the first operating mode is a reduced-power mode compared to the second operating mode.

32 Claims, 6 Drawing Sheets

(56) References Cited

U.S. PATENT DOCUMENTS

| | | |
|---|---|---|
| 2004/0036650 A1 | 2/2004 | Morgan |
| 2004/0181703 A1* | 9/2004 | Lilja et al. .................... 713/324 |
| 2005/0237347 A1 | 10/2005 | Yamaji et al. |
| 2008/0174550 A1 | 7/2008 | Laurila et al. |
| 2008/0234935 A1 | 9/2008 | Wolf et al. |
| 2009/0184849 A1 | 7/2009 | Nasiri et al. |
| 2009/0218957 A1* | 9/2009 | Kraft et al. .................... 315/291 |
| 2009/0239581 A1 | 9/2009 | Lee |
| 2009/0259865 A1* | 10/2009 | Sheynblat et al. ............ 713/323 |
| 2010/0131788 A1* | 5/2010 | Lo ................................. 713/323 |
| 2010/0167792 A1* | 7/2010 | Chen et al. .................... 455/566 |
| 2012/0297226 A1* | 11/2012 | Mucignat et al. ............. 713/323 |
| 2013/0212416 A1* | 8/2013 | Crisan .......................... 713/323 |

FOREIGN PATENT DOCUMENTS

| | | |
|---|---|---|
| JP | 2005284596 A | 10/2005 |
| JP | 2009186376 A | 8/2009 |

* cited by examiner

20
POWER EFFICIENT WAY OF OPERATING MOTION SENSORS

CROSS-REFERENCES TO RELATED APPLICATIONS

This application claims priority to U.S. Provisional Patent Application No. 61/318,746, filed Mar. 29, 2010, entitled "POWER EFFICIENT WAY OF OPERATING MOTION SENSORS," all of which is hereby incorporated herein by reference for all purposes.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various mobile device applications, such as navigation aids, business directories, local news and weather services, or the like, leverage knowledge of the position of the device. In applications that utilize inertial navigation, motion sensors such as accelerometers or gyroscopes are employed to ascertain the position of the device. Accelerometers and gyroscopes output data corresponding to linear acceleration and angular turn rate, respectively, in relation to a monitored device. In some applications, these data are integrated prior to further processing, e.g., to compute velocity from accelerometer data or turn angle from gyroscope data. Integration of motion sensor data typically involves the reading and processing of data from the motion sensors at a substantially high rate (e.g., 100 Hz), increasing processor power consumption and inter-integrated circuit (I2C) bus load.

SUMMARY

The present disclosure is directed to systems and methods for operating motion sensors in a power-efficient manner. An example of a mobile device according to the disclosure includes a processor and a motion sensor communicatively coupled to the processor. The motion sensor includes a motion detection device configured to sense motion of the mobile device and to provide first indications of the motion of the mobile device and a processing device communicatively coupled to the motion detection device and configured to receive the first indications, to generate integrated information by integrating the first indications, and to provide second indications indicative of the integrated information. The processor is configured to obtain selective ones of the second indications.

Implementations of such a mobile device may include one or more of the following features. The processing device of the motion sensor is configured to receive the first indications and to integrate the first indications at a first rate, and the processor is configured to obtain selective ones of the second indications at a second rate that is lower than the first rate. The motion sensor is a gyroscope, the first indications are indications of turn rate, and the second indications are indications of turn angle. The motion sensor is an accelerometer, the first indications are indications of acceleration, and the second indications are indications of velocity. The motion sensor is configured to integrate the motion of the mobile device in accordance with user settings received from a user of the mobile device.

Another example of a mobile device according to the disclosure includes a processor, a gyroscope communicatively coupled to the processor and configured to sense turn rate of the mobile device, and a detector communicatively coupled to the processor and the gyroscope and configured to provide a first indication of a motion state anomaly associated with motion of the mobile device. The processor is configured to cause the gyroscope to transition between a first mode and a second mode in response to the first indication, the first mode being a reduced-power mode compared to the second mode.

Implementations of such a mobile device may include one or more of the following features. The processor is configured to use at least one of the first indication or a second indication associated with sensed acceleration of the mobile device to determine mobile device turn angle while the gyroscope transitions from the first mode to the second mode. The mobile device further includes an accelerometer communicatively coupled to the processor and configured to provide the second indication, and the processor is configured to use the second indication to determine the mobile device turn angle while the gyroscope transitions from the first mode to the second mode. The detector includes a magnetometer, the motion state anomaly is a magnetic anomaly causing magnetometer performance degradation in the mobile device, and the processor is configured to analyze data obtained from the magnetometer to identify the magnetic anomaly. The detector is configured to provide the first indication upon identification of the magnetic anomaly, and the processor is configured to cause the gyroscope to transition from the first mode to the second mode in response to the first indication.

Further implementations of such a mobile device may include one or more of the following features. The detector is configured to provide the first indication upon determining that the mobile device is not rotating, and the processor is configured to cause the gyroscope to transition from the second mode to the first mode in response to the first indication. The mobile device further includes a sensor configured to provide sensed information related to the mobile device, and the processor is communicatively coupled to the sensor and configured to emulate output information of the gyroscope using the sensed information while the gyroscope is transitioning from the first mode to the second mode. The sensor is at least one of an accelerometer or a magnetometer. The second mode is a fully-powered mode, and the gyroscope is configured to perform fewer functions when in the first mode than when the gyroscope is in the second mode.

An example of a method according to the disclosure includes obtaining, at a motion sensor, first indications of sensed motion of a device associated with the motion sensor; integrating, at the motion sensor, the first indications of the sensed motion to obtain integrated motion information; generating, at the motion sensor, second indications of the integrated motion information; and sampling, at a processor disparate from the motion sensor, selective ones of the second indications.

Implementations of such a method may include one or more of the following features. The generating includes generating the second indications at a first rate, and the sampling includes sampling selective ones of the second indications at a second rate that is slower than the first rate. The motion sensor is a gyroscope, the first indications are indications of turn rate, and the second indications are indications of turn angle. The motion sensor is an accelerometer, the first indications are indications of acceleration, and the second indications are indications of velocity. The integrating includes integrating the first indications based on user-provided settings.

Another example of a method according to the disclosure includes obtaining a first indication of a motion state anomaly associated with motion of a mobile device and causing a gyroscope associated with the mobile device to transition between a first operating mode and a second operating mode in response to the first indication. The first operating mode is a reduced-power mode compared to the second operating mode.

Implementations of such a method may include one or more of the following features. The method further includes determining turn angle of the mobile device while the gyroscope transitions from the first operating mode to the second operating mode based on at least one of the first indication or a second indication associated with sensed acceleration of the mobile device. The obtaining includes obtaining the first indication upon determining that the mobile device is not rotating, and the causing includes causing the gyroscope to transition from the second operating mode to the first operating mode in response to the first indication. The obtaining includes obtaining the first indication upon detecting a magnetic anomaly causing magnetometer performance degradation in the mobile device, and the causing includes causing the gyroscope to transition from the first operating mode to the second operating mode in response to the first indication.

An example of a mobile device according to the disclosure includes a processor and a motion sensor communicatively coupled to the processor. The motion sensor includes detection means for sensing motion of the mobile device and generating first information relating to the motion of the mobile device and processing means, communicatively coupled to the detection means, for integrating the first information to generate second information indicative of a result of integrating the first information. The processor is configured to obtain selective samples of the second information.

Implementations of such a mobile device may include one or more of the following features. The processing means is configured to generate the second information at a first rate, and the processor is configured to obtain selective samples of the second information at a second rate that is lower than the first rate. The first information relates to turn rate of the mobile device and the second information relates to turn angle of the mobile device. The first information relates to acceleration of the mobile device and the second information relates to velocity of the mobile device. The mobile device further includes interface means, communicatively coupled to the processing means, for obtaining user settings from a user of the mobile device, and the processing means is configured to integrate the first information in accordance with the user settings.

Another example of a mobile device according to the disclosure includes a processor, a gyroscope communicatively coupled to the processor and configured to sense turn rate of the mobile device, and monitor means, communicatively coupled to the processor and the gyroscope, for generating first information relating to a motion state anomaly associated with motion of the mobile device. The processor is configured to cause the gyroscope to transition between an inactive mode and an active mode in response to the first information.

Implementations of such a mobile device may include one or more of the following features. The processor is further configured to utilize at least one of the first information or second information associated with acceleration of the mobile device to determine turn angle of the mobile device while the gyroscope is operating in the inactive mode or transitioning from the inactive mode to the active mode. The monitor means is configured to provide the first information upon determining that the mobile device is not rotating, and the processor is configured to cause the gyroscope to transition from the active mode to the inactive mode in response to the first information. The monitor means is configured to provide the first information upon detecting a magnetic anomaly causing magnetometer performance degradation in the mobile device, and the processor is configured to cause the gyroscope to transition from the inactive mode to the active mode in response to the first information.

An example of a computer program product according to the disclosure resides on a non-transitory processor-readable medium and includes processor-readable instructions configured to cause a processor to obtain first indications of sensed motion of a device corresponding to an associated motion sensor; integrate the first indications to obtain integrated motion information; generate second indications of the integrated motion information; and provide, to a disparate processing unit, selective ones of the second indications.

Implementations of such a computer program product may include one or more of the following features. The first indications are integrated at a first rate and the selective ones of the second indications are provided to the disparate processing unit at a second rate that is slower than the first rate. The first indications are indications of turn rate and the second indications are indications of turn angle. The first indications are indications of acceleration and the second indications are indications of velocity.

Another example of a computer program product according to the disclosure resides on a non-transitory processor-readable medium and includes processor-readable instructions configured to cause a processor to obtain a first indication of a motion state anomaly associated with motion of a mobile device and instruct transition of a gyroscope associated with the mobile device between a first mode and a second mode in response to the first indication, where the first mode is a reduced-power mode compared to the second mode.

Implementations of such a computer program product may include one or more of the following features. The computer program product further includes processor-readable instructions configured to cause a processor to determine turn angle of the mobile device while the gyroscope transitions from the first mode to the second mode based on at least one of the first indication or a second indication associated with sensed acceleration of the mobile device. The processor-readable instructions configured to cause a processor to obtain include processor-readable instructions configured to cause the processor to obtain the first indication upon determining that the mobile device is not rotating, and the processor-readable instructions configured to cause a processor to instruct include processor-readable instructions configured to cause the processor to instruct transition of the gyroscope from the second mode to the first mode in response to the first indication. The processor-readable instructions configured to cause a processor to obtain include processor-readable instructions configured to cause the processor to obtain the first indication upon detecting a magnetic anomaly causing magnetometer performance degradation in the mobile device, and the processor-readable instructions configured to cause a processor to instruct include processor-readable instructions configured to cause the processor to instruct transition of the gyroscope from the first mode to the second mode in response to the first indication.

Items and/or techniques described herein may provide one or more of the following capabilities, as well as other capabilities not mentioned. Motion sensor power consumption can be reduced. Processor and data bus load can be reduced, freeing up resources for other operations. Low-power sensors can be utilized in place of motion sensors having a higher cost and higher power consumption. While at least one item/technique-effect pair has been described, it may be possible for a noted effect to be achieved by means other than that noted, and a noted item/technique may not necessarily yield the noted effect.

DETAILED DESCRIPTION

Techniques are described herein for operating and utilizing motion sensors in a resource-efficient manner. In applications that utilize integrated motion sensor data, such as velocity from accelerometer data or turn angle from gyroscope data, the integration is offloaded to processing devices at the motion sensors. Thus, in contrast to techniques where a main processor samples motion sensor data at a relatively high rate (e.g., 100 Hz) and computes the integrated data, a processing unit can instead sample integrated data provided by the motion sensors at a lower rate (e.g., 1 Hz), reducing processor load and power consumption and increasing available I2C bus bandwidth.

Additionally, with regard to a gyroscope operating in the context of a non-inertial application, the operating state of the gyroscope is managed to reduce the power consumption of the gyroscope. A gyroscope is deactivated or placed in a low-power operating mode (e.g., a sleep or idle mode) after calibration in various cases. For example, the gyroscope is placed in a lower power mode when a device associated with the gyroscope is not rotating (i.e., such that the turn angle is zero). If another motion sensor, such as an accelerometer, magnetometer, etc., detects that the device has started rotation, the gyroscope is reactivated. The gyroscope is also placed in a low power mode when device rotation is occurring but rotation sensors that are more power-efficient than the gyroscope, such as a magnetometer, can measure the rotation with an acceptable degree of accuracy. If the magnetometer detects an anomaly (e.g., a magnetic anomaly), the gyroscope is reactivated to aid the magnetometer. While the gyroscope is in an idle mode or waking up from an idle mode, other motion sensors with lower power consumption, such as accelerometers or magnetometers, are utilized to obtain information relating to angular motion. These techniques are examples only and are not limiting of the disclosure or the claims.

Figure 1:
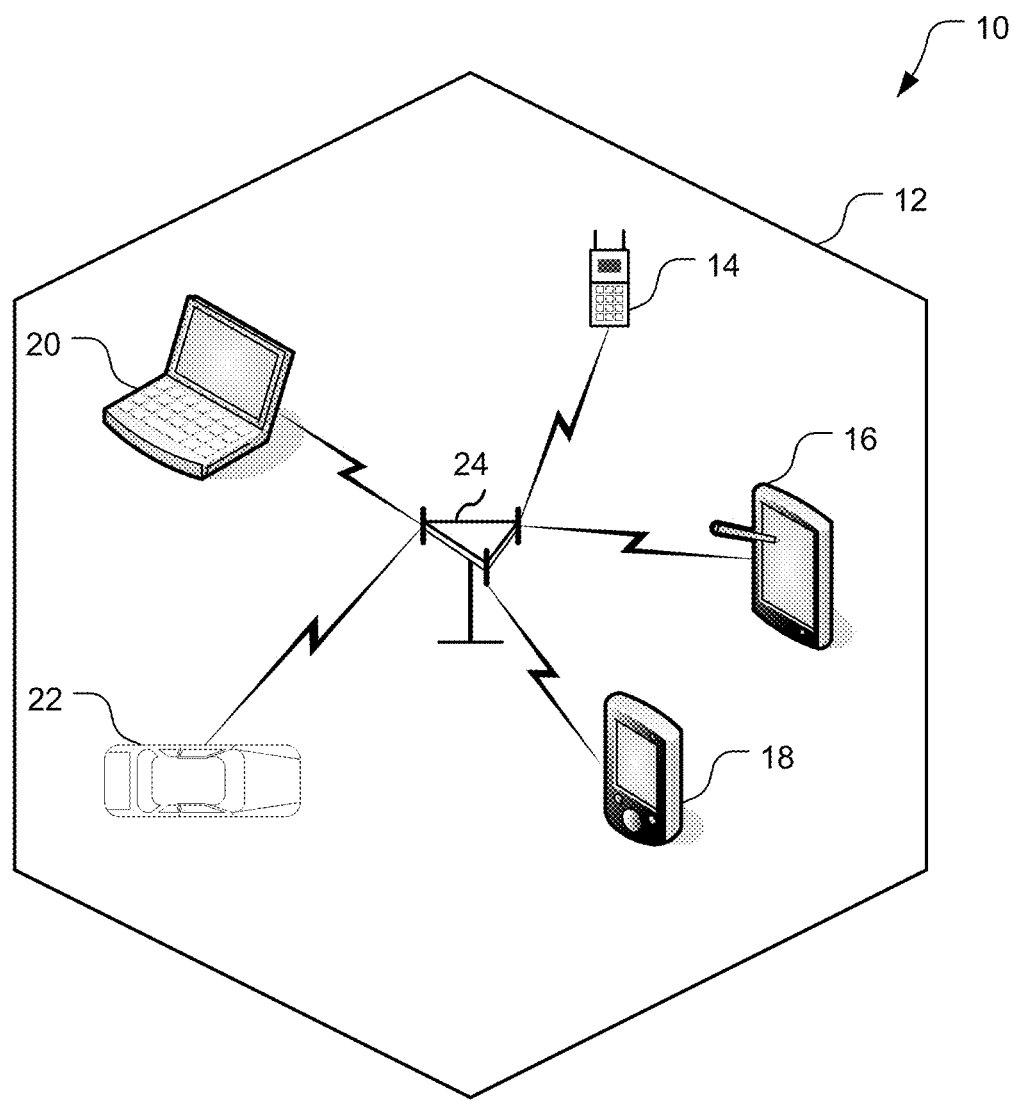
FIG. 1 is a schematic diagram of a wireless telecommunication system.

Referring to FIG. 1, a wireless communication system 10 includes base transceiver stations (BTSs) 24 disposed in cells 12. The BTSs 24 provide communication service for a variety of wireless communication devices, referred to herein as mobile access terminals 14 (ATs). Wireless communication devices served by a BTS 24 can include, but are not limited to, personal digital assistants (PDAs) 16, smartphones 18, computing devices 20 such as laptop, desktop or tablet computers, automobile computing systems 22, or the like.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTS 24 can wirelessly communicate with the ATs 14, including devices 16-22, in the system 10 via antennas. A BTS 24 may also be referred to as a base station, an access point, an access node (AN), a Node B, an evolved Node B (eNB), etc. The BTS 24 is configured to communicate with ATs 14 via multiple carriers. The BTS 24 can provide communication coverage for a respective geographic area, here the cell 12. The cell 12 of the BTS 24 can be partitioned into multiple sectors as a function of the base station antennas.

The system 10 may include only macro base stations 24 or it can have base stations 24 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The ATs 14 can be dispersed throughout the cell 12. The ATs 14 may be referred to as terminals, mobile stations, mobile devices, user equipment (UE), subscriber units, etc. While various example devices 16-22 are illustrated by FIG. 1, other devices can also serve as ATs 14 in the system 10.

Figure 2:
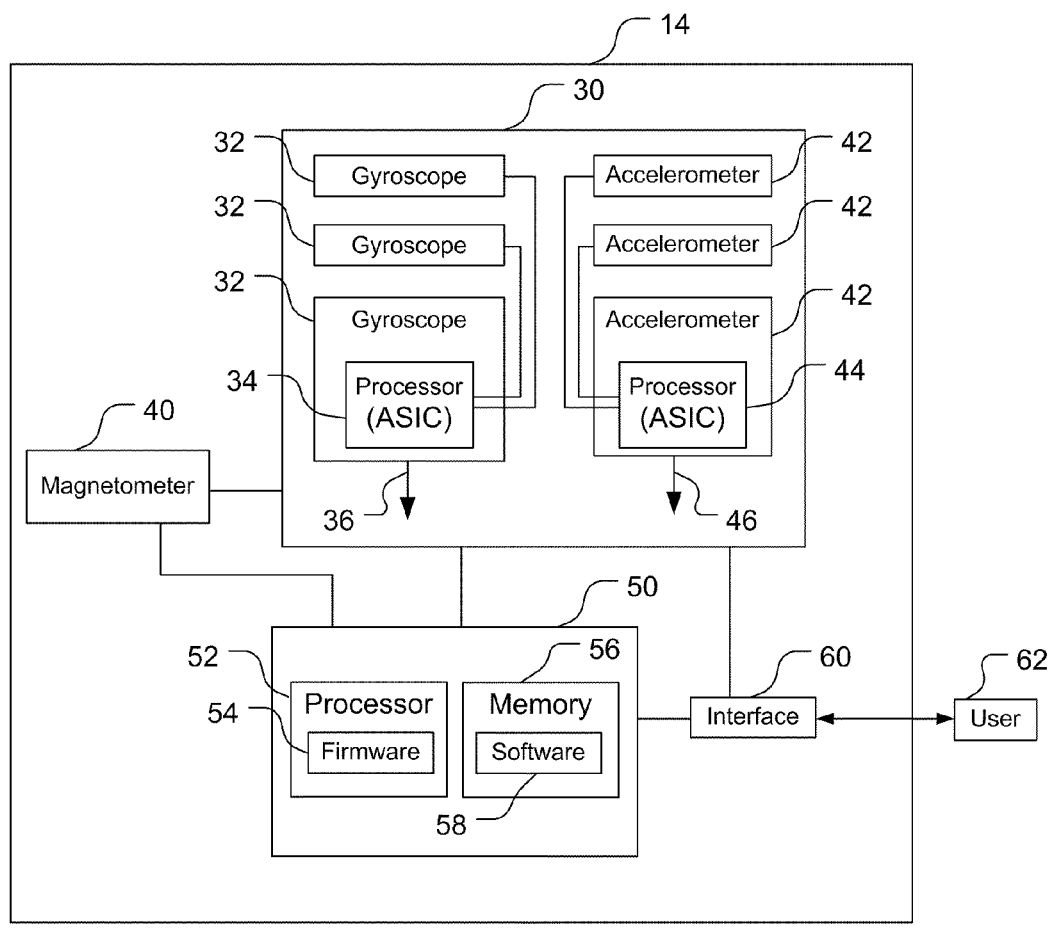
FIG. 2 is a block diagram of components of a mobile station shown in FIG. 1.

Referring also to FIG. 2, an example mobile device 14 comprises a motion sensor 30 including motion detection devices such as gyroscopes 32, accelerometers 42, etc., that obtain data relating to movement of the mobile device 14. The gyroscopes 32 measure angular motion or turn rate of the mobile device 14, e.g., with respect to roll, pitch, and/or yaw axes. The accelerometers 42 measure linear acceleration of the mobile device 14 with respect to a device-frame coordinate system (e.g., an x-y-z coordinate system as defined by sensor axes of the mobile device 14), an Earth-frame coordinate system (e.g., a north-east-down or n-e-d coordinate system), etc. Further, the accelerometers 42 measure the direction of gravitational acceleration relative to the mobile device 14 to assist in identifying the orientation of the mobile device 14. Here, three gyroscopes 32 and accelerometers 42 are illustrated, each of which measures acceleration along one axis. Alternatively, multi-axis gyroscopes or accelerometers can be utilized to measure acceleration along multiple axis within a single unit.

The motion sensor 30 further includes processing devices, such as ASICs 34 and 44, that are configured to process data obtained by the gyroscopes 32 and accelerometers 42 at a substantially high sample rate. Here, a first ASIC 34 is associated with the gyroscopes 32 and a second ASIC 44 is associated with the accelerometers 42. Other processing devices and processing device configurations could also be utilized.

The mobile device 14 further includes a magnetometer (or compass) 40. The magnetometer 40 is configured to provide an indication of the direction, in three dimensions, of magnetic north relative to the mobile device 14, e.g., to a coordinate system of the mobile device 14. The magnetometer 40 can also provide an indication of the direction of true north relative to the mobile device by implementing one or more algorithms (e.g., based on magnetic declination and/or other compensating factors) to relate magnetic north to true north. Directional data obtained by the magnetometer 40 is utilized to assist in determining the position and/or orientation of the mobile device 14, either with the aid of or independently of the motion sensor 30. Further, the rate of change of the directional data measured by the magnetometer 40 can be used, with or without assistance from the accelerometers 42, to emulate a "virtual gyroscope" based on the magnetometer measurements.

The mobile device additionally includes a computing system 50 including a processor 52 operating according to firmware 54 and a memory 56 including software 58. Here, the processor 52 is an intelligent hardware device, e.g., a central processing unit (CPU) such as those made by Intel® Corporation or AMD®, a microcontroller, an ASIC, etc. The memory 56 includes non-transitory storage media such as random access memory (RAM) and read-only memory (ROM). Additionally or alternatively, the memory 56 can include one or more physical and/or tangible forms of non-transitory storage media including, for example, a floppy disk, a hard disk, a CD-ROM, a Blu-Ray disc, any other optical medium, an EPROM, a FLASH-EPROM, any other memory chip or cartridge, or any other non-transitory medium from which a computer can read instructions and/or code. The memory 56 stores the software 58, which is computer-readable, computer-executable software code containing instructions that are configured to, when executed, cause the processor 52 to perform various functions described herein. Alternatively, the software 58 may not be directly executable by the processor 52 but is configured to cause the computer, e.g., when compiled and executed, to perform the functions.

An interface 60 is employed by the mobile device 14 to facilitate interaction between the mobile device 14 and a user 62. For example, the interface 60 can include various input/output (I/O) devices that enable the user 62 to provide information to, or receive information from, the mobile device 14. Examples of I/O devices that can be employed within the interface 60 include a display, speaker, keypad, touch screen or touchpad, microphone, etc. Additionally, the interface 60 can comprise a bus (e.g., an I2C bus, etc.) or other means for facilitating information transfer and/or control between respective components of the mobile device 14, such as the motion sensor 30 and the computing system 50.

The mobile device 14, through the motion sensor 30 and computing system 50, can utilize a variety of applications for determining position, direction and/or velocity of the mobile device 14. For some applications, data obtained by the gyroscopes 32 and/or accelerometers 42 are integrated. For example, integrations are performed to compute delta velocity from accelerometer data and/or to compute turn angle from gyroscope data. These integrations generally occur at a high rate, which consumes large amounts of CPU power and other resources. Further, as data is provided for these integrations at a high rate, a significant amount of I2C bus bandwidth is utilized in connection with the integrations.

To reduce the power consumption associated with integration of motion sensor data, the integrations are performed within the sensor ASICs 34 and 44. As the sensor ASICs 34 and 44 are conventionally configured to process data at a high rate, offloading integrations of the sensor data to the sensor ASICs 34 and 44 can be achieved with minimal impact on the performance of the motion sensor 30. The sensor ASICs 34 and 44 produce respective integration results 36 and 46, which are sampled by the computing system 50 at a relatively low rate. By reducing the rate at which the computing system 50 performs actions relating to the motion sensor 30, the resource usage of the computing system 50 is decreased. Offloading integrations of the sensor data to the sensor ASICs 34 and 44 also reduces the amount of I2C bandwidth consumption associated with the computing system 50, as high-rate transfers of data (e.g., turn angle, velocity, etc.) associated with the integrations are not conducted over the I2C bus.

Figure 3:
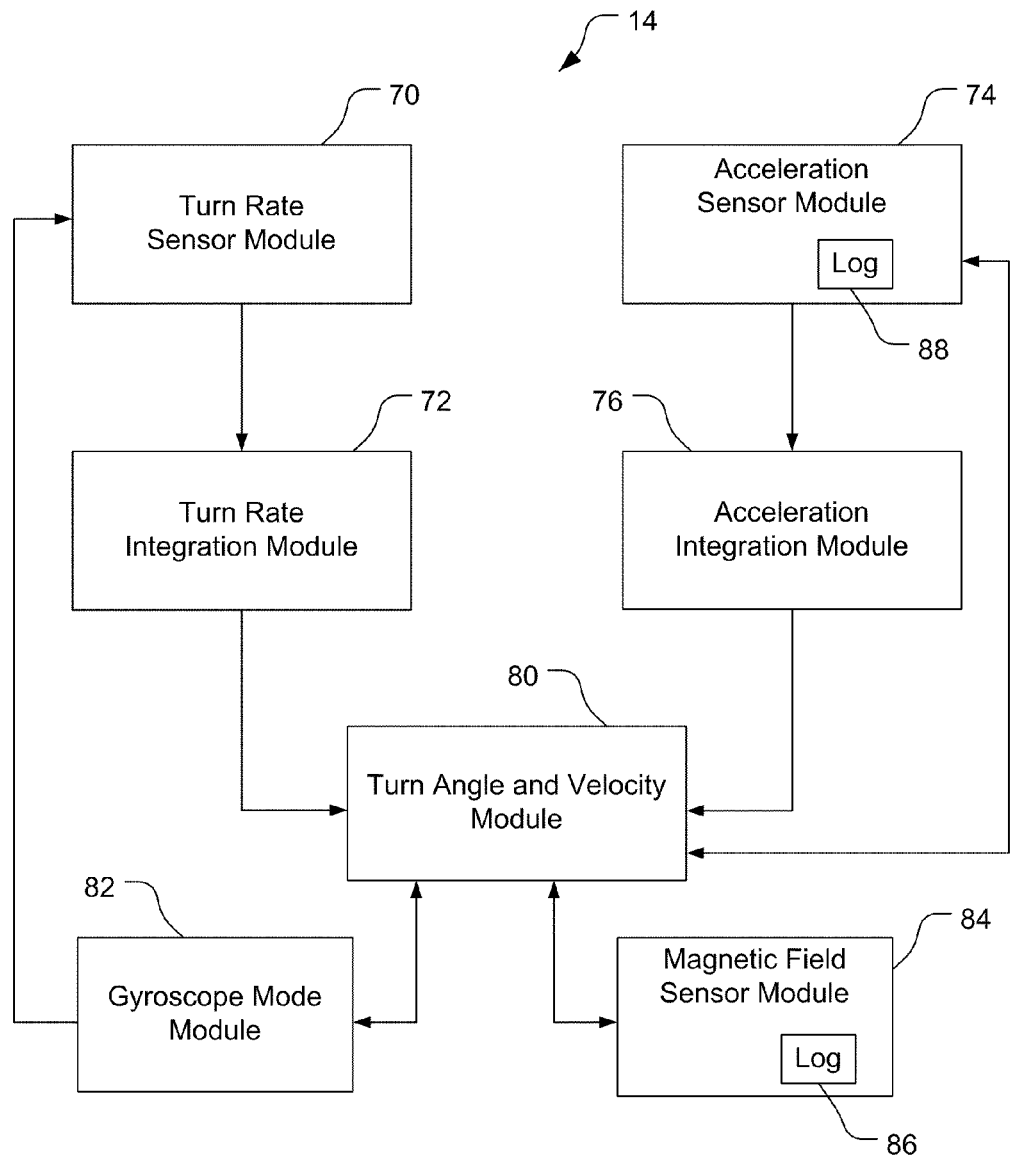
FIG. 3 is a partial functional block diagram of a system for managing resource usage of a wireless communication device employing motion sensors.

The mobile device 14, via the motion sensor 30 and computing system 50, can operate to implement a system for resource-efficient motion sensing as illustrated by FIG. 3. Here, a turn rate sensor module 70 (e.g., implemented by gyroscope(s) 32) determines and generates information relating to the turn rate of the mobile device 14. Additionally, an acceleration sensor module (e.g., implemented by accelerometer(s) 42) measure acceleration of the mobile device 14. As described above, sampling and integrating motion sensor data at a computing system 50 of the mobile device 14 results in a high degree of power consumption and resource overhead. To mitigate this overhead, a turn rate integration module 72 separate from the computing system 50 (e.g., implemented by a sensor ASIC 34 associated with the gyroscope(s) 32) of the mobile device 14 can integrate the turn rate data based on measurements by the turn rate sensor module 70 in order to compute the turn angle of the mobile device 14. The integrated turn rate data is then collected by a turn angle and velocity module 80, from which the computing system 50 of the mobile device 14 can sample the turn angle at a relatively low rate (e.g., 1 Hz). By sampling turn angle data from the turn angle and velocity module 80 instead of computing the turn angle at the computing system 50, the number of operations performed by the computing system 50 in association with obtaining the turn angle of the mobile device 14 is reduced for applications in which high-rate updates to turn angle are not utilized.

Similarly, in the case of applications that integrate acceleration data to obtain velocity information corresponding to the mobile device 14, an acceleration integration module 76 integrates the acceleration data (e.g., using a sensor ASIC 44 associated with accelerometer(s) 42) to obtain the velocity of the mobile device 14. This velocity information is then provided to the turn angle and velocity module 80 where it can be sampled by the computing system 50 of the mobile device 14 at a rate that is substantially slower than the rate at which the acceleration sensor module 74 obtains acceleration samples and the rate at which the acceleration integration module 76 performs calculations. The rate at which velocity is sampled from the turn angle and velocity module 80 can be the same as, or different from, the rate at which turn angle is sampled.

To improve the accuracy of integration by the turn rate integration module 72, various properties of data provided by the turn rate sensor module 70 and/or the acceleration sensor module 74 can be predetermined and/or set by a user 62. For example, a user 62 can adjust the offset or bias of the turn rate sensor module 70 and/or the acceleration sensor module 74, which is defined as the output of the turn rate sensor module 70 at zero input (i.e., no angular motion). Further, the user 62 can adjust the sensitivity of the turn rate sensor module 70 and/or the acceleration sensor module 74, which is defined as the ratio between the output signal(s) of the turn rate sensor module 70 and/or the acceleration sensor module 74 and the actual measured motion of the mobile device 14. A user 62 can provide these settings within, e.g., a calibration mechanism provided via the interface 60 and/or by other means. Additionally, a quaternion or other metrics can be determined locally at the gyroscope(s) 32 and sampled by the computing system 50. A user 62 can also reset parameters such as initial angle, velocity, quaternions, etc., to zeros or desired values, from which the turn rate integration module 72 and/or acceleration integration module 76 can perform integrations.

In addition to offloading integrations to the sensors associated with the mobile device 14, a gyroscope mode module 82 associated with the mobile device 14 is configured to control the operating mode of gyroscope(s) 32 associated with the mobile device 14, such as those associated with the turn rate sensor module 70. For non-inertial applications, such as tilt-compensated compass applications or the like, the mobile device 14 does not need to continuously utilize the turn rate sensor module 70 because sufficient accuracy may be achievable from accelerometer(s) 42 and/or a magnetometer 40. Accordingly, the turn rate sensor module 70 can be powered down, placed in a sleep or idle mode, and/or otherwise deactivated by the gyroscope mode module 82 upon the satisfaction of various conditions. The gyroscope mode module 82 can subsequently reactivate the turn rate sensor module 70 when turn rate computations by the turn rate sensor module 70 are again desired.

The gyroscope mode module 82 can place the turn rate sensor module 70 in a low power operating mode in a variety of cases. For instance, the gyroscope mode module 82 can power down the turn rate sensor module 70 when the mobile device 14 is not rotating, e.g., such that the turn angle is zero. In this case, when a change in movement (e.g., start of device rotation) is detected by an accelerometer 42 and/or magnetometer 40, the turn rate sensor module 70 is powered up.

Additionally or alternatively, the gyroscope mode module 82 can place the turn rate sensor module 70 in a low power operating mode when device rotation is occurring, but more power-efficient rotation sensors as compared to the turn rate sensor module 70, such as a magnetometer 40 or the like, can measure the rotation with desired accuracy. For instance, the gyroscope mode module 82 places the turn rate sensor module 70 in a sleep state after calibration of the orientation of the mobile device 14 (e.g., with reference to a user's body, a vehicle, etc.) and the motion pattern (e.g., pitch and roll swing, etc.). Upon placing the turn rate sensor module 70 in a sleep mode, a magnetic field sensor module 84 (e.g., implemented via a magnetometer 40) monitors the magnetic field associated with an area surrounding the mobile device 14. If a magnetic anomaly is detected by the magnetic field sensor module 84, the turn rate sensor module 70 is brought out of the sleep mode by the gyroscope mode module 82 to aid the magnetic field sensor module 84, as a magnetometer 40, accelerometer(s) 42, or the like may not be sufficient to substitute for the turn rate sensor module 70 in the event of a magnetic anomaly.

A magnetic anomaly can be detected by the magnetic field sensor module using various techniques. For example, the magnetic field sensor module 84 can compare a magnetic field measurement to a history of past measurements, e.g., maintained by the magnetic field sensor module 84 in a log 86. If the comparison indicates a deviation from the past measurements, such as that caused by a change in direction, movement of the mobile device 14 from a previously stopped position, etc., the magnetic field sensor module 84 detects an anomaly and the turn rate sensor module 70 is activated.

The gyroscope mode module 82 places the turn rate sensor module 70 in sleep mode when it is determined, via data from the acceleration sensor module 74 and/or the magnetic field sensor module 84, that the mobile device 14 is not moving. In the event that the mobile device 14 is stationary, the turn rate of the mobile device 14 is determined to be zero without the aid of the turn rate sensor module 70. Upon detecting motion of the mobile device 14, e.g., via the acceleration sensor module 74, the gyroscope mode module 82 wakes up the turn rate sensor module 70.

Due to device motion detection delay, magnetic anomaly detection delay, gyroscope startup time or other factors, there may be a time interval when data from the turn rate sensor module 70 is needed but not yet available. Accordingly, other sensors, such as the acceleration sensor module 74 and the magnetic field sensor module 84, can be utilized to determine the turn angle of the mobile device 14 during the startup delay of the turn rate sensor module 70. During the wakeup delay of the turn rate sensor module 70, other, less power consuming (and continuously powered) sensors, such as the acceleration sensor module 74 and the magnetic field sensor module 84, can substitute for the sensor data of the turn rate sensor module 70 until the turn rate sensor module 70 wakes from sleep mode.

Figure 4:
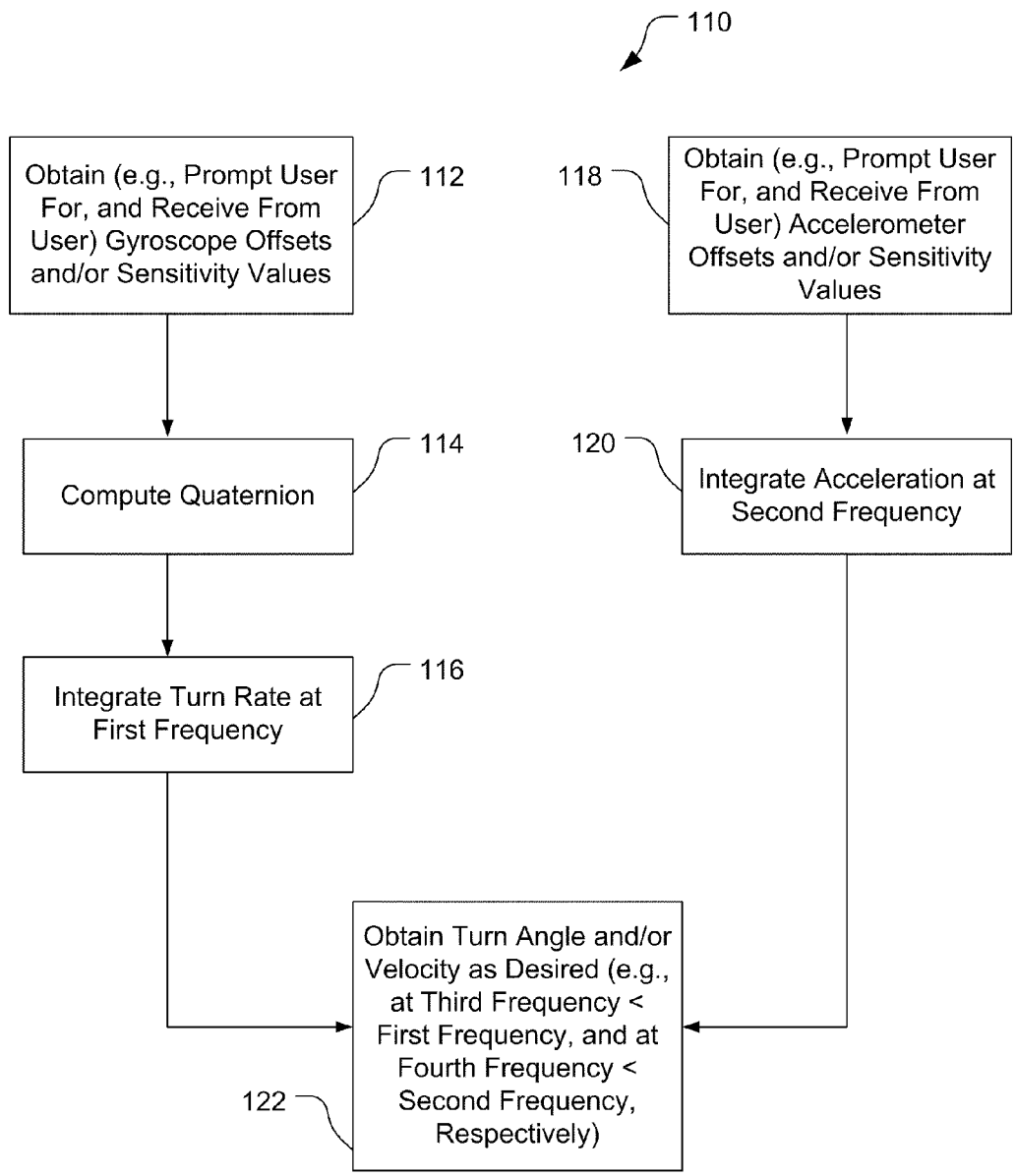
FIG. 4 is a block flow diagram of a process of computing turn angle and/or velocity using motion sensors.

Referring to FIG. 4, with further reference to FIGS. 1-3, a process 110 of computing turn angle and/or velocity using motion sensors includes the stages shown. The process 110 is, however, an example only and not limiting. The process 110 can be altered, e.g., by having stages added, removed, rearranged, combined, and/or performed concurrently. Still other alterations to the process 110 as shown and described are possible.

At stage 112, offsets and/or sensitivity values corresponding to a turn rate sensor module 70 (e.g., implemented by one or more gyroscopes 32) are obtained, e.g., by prompting a user 62 for the values and receiving the values from the user 62 via an interface 60. A quaternion is computed at stage 114, and a turn rate of the mobile device 14 as measured by the turn rate sensor module 70 is integrated at a first frequency at stage 116. The computations at stages 114 and 116 are performed locally at the motion sensor using a sensor ASIC 34 or other suitable processing device associated with the motion sensor 30, reducing CPU loading and power consumption. For example, the turn rate integration module 72 can be implemented wholly or in part via a sensor ASIC 34 to perform the integrations described at stage 116. The sensor ASIC 34 or other processing device operates according to software, firmware, etc., configured to cause the processing device to perform the computations.

Similarly, at stage 118, offsets and/or sensitivity values corresponding to an acceleration sensor module 74 (e.g., implemented via one or more accelerometers 42) are obtained, e.g., in a manner similar to that described with respect to stage 112. Data relating to acceleration measured by the acceleration sensor module 74 is then integrated at a second frequency by an acceleration integration module 76 or other suitable means at stage 120. The acceleration integration module 76, which performs the integrations described at block 120, can be implemented locally at the motion sensor 30 using a sensor ASIC 44 or other suitable processing device associated with the motion sensor 30, reducing CPU loading and power consumption. The sensor ASIC 44 or other processing device operates according to software, firmware, etc., configured to cause the processing device to perform the computations.

Upon integrating first indications of the turn rate of the mobile device 14 at stage 116 and integrating first indications of the acceleration of the mobile device 14 at stage 120, resulting second indications of the integrated turn rate and acceleration data are utilized at stage 122 to obtain the turn angle and velocity of the mobile device 14. The turn angle of the mobile device 14 is obtained at a third frequency that is slower than the first frequency, reducing CPU sample rate and conserving processing resources. Similarly, the velocity of the mobile device 14 is obtained at a fourth frequency that is slower than the second frequency. The first frequency and the second frequency may differ as the turn rate sensor module 70 and the acceleration sensor module 74 may operate at different rates. Further, the third frequency and the fourth frequency may differ due to varying application requirements, sample rate configurations, or the like.

Figure 5:
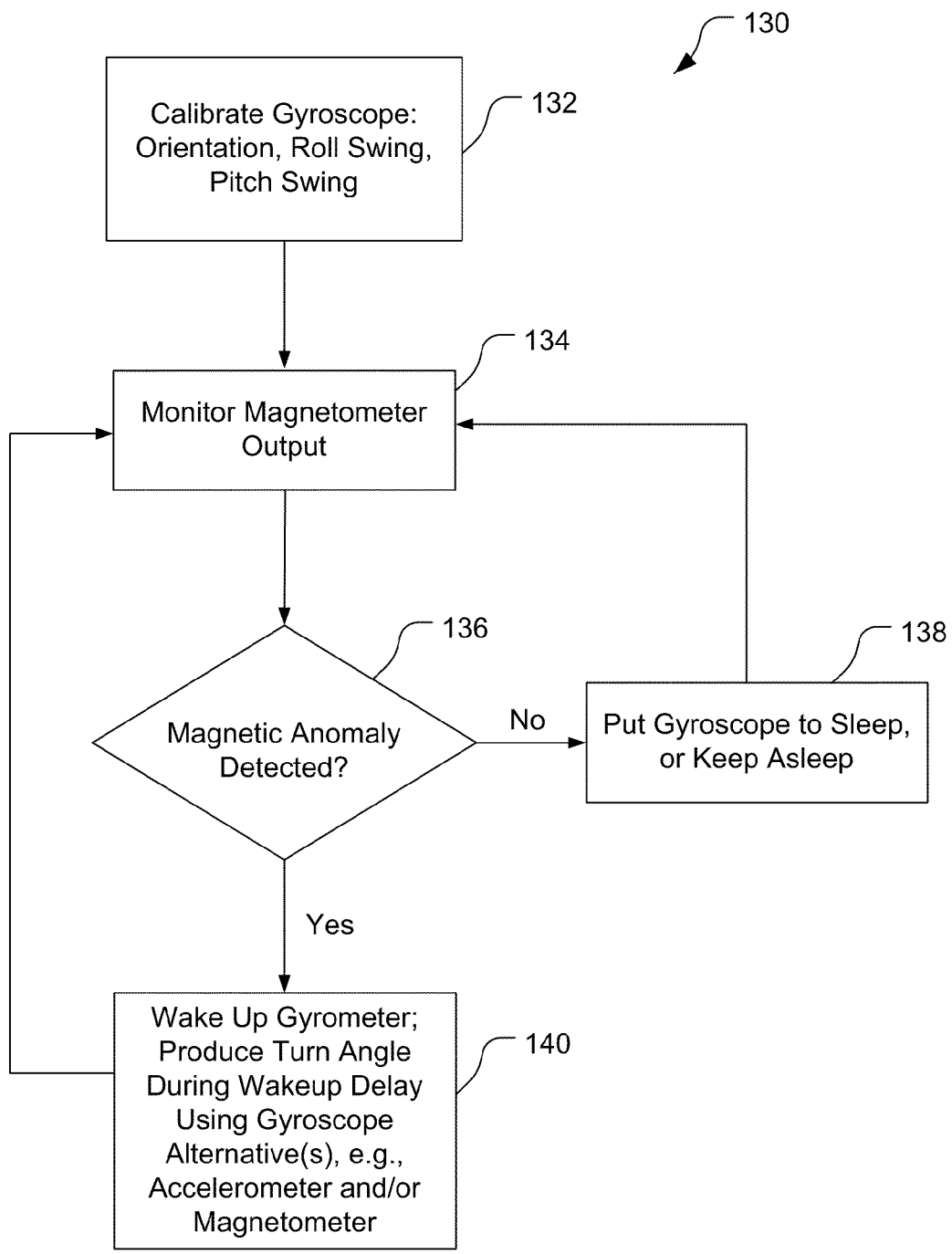
FIGS. 5-6 are block flow diagrams of respective processes of managing the operating state of a gyroscope.

Referring next to FIG. 5, with further reference to FIGS. 1-3, a process 130 of managing the operating state of a gyroscope 32 includes the stages shown. The process 130 is, however, an example only and not limiting. The process 130 can be altered, e.g., by having stages added, removed, rearranged, combined, and/or performed concurrently. Still other alterations to the process 130 as shown and described are possible.

At stage 132, the orientation, roll swing and pitch swing of the gyroscope 32 are calibrated. Calibration can be performed based on inputs provided by a user 62 via an interface 60, automated processes, etc. At stage 134, the output of a magnetometer 40 associated with a mobile device 14 that includes the gyroscope 32 is monitored. At stage 136, if the magnetometer output monitored at stage 134 indicates a magnetic anomaly has not been detected (e.g., change in the magnetometer output is less than a threshold), the gyroscope 32 is put in a sleep state, or kept in a pre-existing sleep state, at stage 138. Otherwise, if a magnetic anomaly is detected at stage 136 (e.g., due to change in the magnetometer output being greater than a threshold), the gyroscope 32 is woken from the sleep state at stage 140.

During the time period in which the gyroscope 32 enters an active state from the sleep state, a turn angle associated with the mobile device 14 is produced at stage 140 using alternative mechanisms to the gyroscope 32. For example, an indication of a magnetic anomaly obtained from a magnetometer 40, an indication of acceleration or velocity obtained from an accelerometer 42, etc., can be utilized at stage 140 to produce the turn angle of the mobile device 14 until the gyroscope 32 becomes active.

Figure 6:
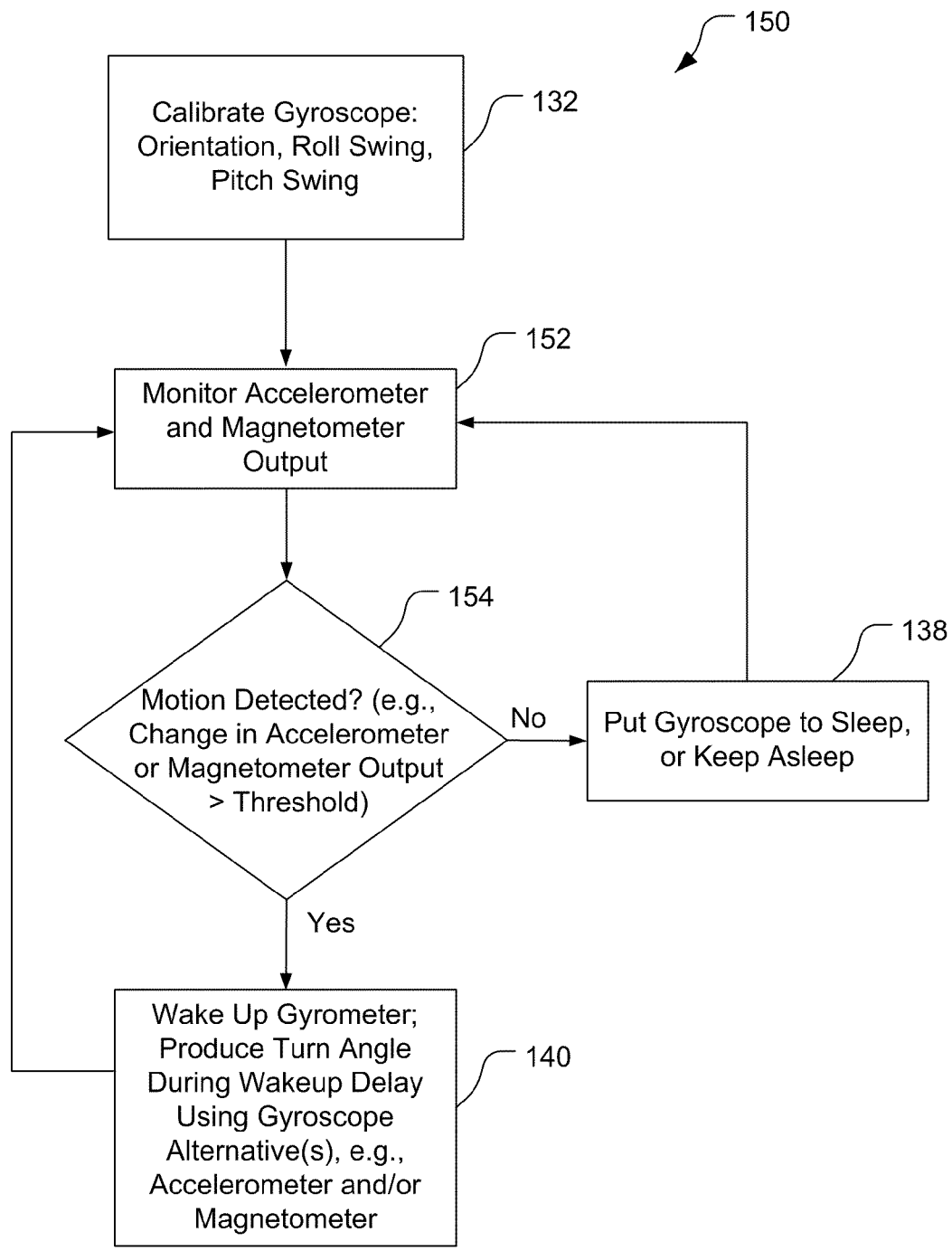

Referring to FIG. 6, with further reference to FIGS. 1-3, an alternative process 150 of managing the operating state of a gyroscope 32 includes the stages shown. The process 150 is, however, an example only and not limiting. The process 150 can be altered, e.g., by having stages added, removed, rearranged, combined, and/or performed concurrently. Still other alterations to the process 150 as shown and described are possible.

Process 150 begins with gyroscope calibration at stage 132 as described above with respect to FIG. 5. At stage 152, the output of a magnetometer 40 and accelerometer(s) 42 associated with a mobile device 14 that includes the gyroscope 32 is monitored. At stage 154, if motion of the mobile device 14 is not detected (e.g., change in the accelerometer and/or magnetometer output is less than a threshold), the gyroscope is placed in sleep mode at stage 138 as described above. Otherwise, if motion of the mobile device is detected, the gyroscope is reactivated, and interim turn angle measurements are performed using gyroscope alternatives (e.g., an accelerometer 42 and/or magnetometer 40) at stage 140 as additionally described above.

While the processes 130 and 150 are described in terms of a sleep mode, any suitable fully-powered mode and reduced-power mode can be utilized. Other operating mode transitions where the gyroscope 32 transitions between a first mode to a second mode, where the first mode is a partially-functional and/or reduced-power mode as compared to the second mode, are possible.

Still other techniques are possible.

What is claimed is:

1. A mobile device comprising:
a processor; and
a motion sensor communicatively coupled to the processor and including:
a motion detection device configured to sense motion of the mobile device and to provide first indications of the motion of the mobile device; and
a processing device communicatively coupled to the motion detection device and configured to receive the first indications, to generate integrated information by integrating the first indications, and to provide second indications indicative of the integrated information;
wherein the processor is configured to obtain selective ones of the second indications;
wherein the processing device of the motion sensor is configured to receive the first indications and to integrate the first indications at a first rate, and the processor is configured to obtain selective ones of the second indications at a second rate that is lower than the first rate.

2. The mobile device of claim 1 wherein the motion sensor is a gyroscope, the first indications are indications of turn rate, and the second indications are indications of turn angle.

3. The mobile device of claim 1 wherein the motion sensor is an accelerometer, the first indications are indications of acceleration, and the second indications are indications of velocity.

4. The mobile device of claim 1 wherein the motion sensor is configured to integrate the motion of the mobile device in accordance with user settings received from a user of the mobile device.

5. A mobile device comprising:
a processor;
a gyroscope communicatively coupled to the processor and configured to sense turn rate of the mobile device; and
a detector communicatively coupled to the processor and the gyroscope and configured to provide a first indication of a motion state anomaly associated with motion of the mobile device;
wherein the processor is configured to cause the gyroscope to transition between a first mode and a second mode in response to the first indication, the first mode being a reduced-power mode compared to the second mode;
wherein the processor is configured to use at least one of the first indication or a second indication associated with sensed acceleration of the mobile device to determine mobile device turn angle while the gyroscope transitions from the first mode to the second mode.

6. The mobile device of claim 5 further comprising an accelerometer communicatively coupled to the processor and configured to provide the second indication, wherein the processor is configured to use the second indication to determine the mobile device turn angle while the gyroscope transitions from the first mode to the second mode.

7. The mobile device of claim 5 wherein the detector comprises a magnetometer, the motion state anomaly is a magnetic anomaly causing magnetometer performance degradation in the mobile device, and the processor is configured to analyze data obtained from the magnetometer to identify the magnetic anomaly.

8. The mobile device of claim 7 wherein the detector is configured to provide a third indication upon identification of the magnetic anomaly, and the processor is configured to cause the gyroscope to transition from the first mode to the second mode in response to the third indication.

9. The mobile device of claim 5 wherein the detector is configured to provide the first indication upon determining that the mobile device is not rotating, and the processor is configured to cause the gyroscope to transition from the second mode to the first mode in response to the first indication.

10. The mobile device of claim 5 further comprising a sensor configured to provide sensed information related to the mobile device, wherein the processor is communicatively coupled to the sensor and configured to emulate output information of the gyroscope using the sensed information while the gyroscope is transitioning from the first mode to the second mode.

11. The mobile device of claim 10 wherein the sensor is at least one of an accelerometer or a magnetometer.

12. The mobile device of claim 5 wherein the second mode is a fully-powered mode and wherein the gyroscope is configured to perform fewer functions when in the first mode than when the gyroscope is in the second mode.

13. A method of operating a motion sensor, the method comprising:
obtaining, at the motion sensor, first indications of sensed motion of a device associated with the motion sensor;
integrating, at the motion sensor, the first indications of the sensed motion to obtain integrated motion information;
generating, at the motion sensor, second indications of the integrated motion information; and
sampling, at a processor disparate from the motion sensor, selective ones of the second indications;
wherein the generating comprises generating the second indications at a first rate and the sampling comprises sampling selective ones of the second indications at a second rate that is slower than the first rate.

14. The method of claim 13 wherein the motion sensor is a gyroscope, the first indications are indications of turn rate, and the second indications are indications of turn angle.

15. The method of claim 13 wherein the motion sensor is an accelerometer, the first indications are indications of acceleration, and the second indications are indications of velocity.

16. The method of claim 13 wherein the integrating comprises integrating the first indications based on user-provided settings.

17. A method of operating a motion sensor, the method comprising:
obtaining a first indication of a motion state anomaly associated with motion of a mobile device;
causing a gyroscope associated with the mobile device to transition between a first operating mode and a second operating mode in response to the first indication; and
determining turn angle of the mobile device while the gyroscope transitions from the first operating mode to the second operating mode based on at least one of the first indication or a second indication associated with sensed acceleration of the mobile device;
wherein the first operating mode is a reduced-power mode compared to the second operating mode.

18. The method of claim 17 wherein the obtaining comprises obtaining a third indication upon determining that the mobile device is not rotating, and the causing comprises causing the gyroscope to transition from the second operating mode to the first operating mode in response to the third indication.

19. The method of claim 17 wherein the obtaining comprises obtaining the first indication upon detecting a magnetic anomaly causing magnetometer performance degradation in the mobile device, and the causing comprises causing the gyroscope to transition from the first operating mode to the second operating mode in response to the first indication.

20. A mobile device comprising:
a processor; and
a motion sensor communicatively coupled to the processor and including:
detection means for sensing motion of the mobile device and generating first information relating to the motion of the mobile device; and
processing means, communicatively coupled to the detection means, for integrating the first information to generate second information indicative of a result of integrating the first information;
wherein the processor is configured to obtain selective samples of the second information;
wherein the processing means is configured to generate the second information at a first rate and the processor is configured to obtain selective samples of the second information at a second rate that is lower than the first rate.

21. The mobile device of claim 20 wherein the first information relates to turn rate of the mobile device and the second information relates to turn angle of the mobile device.

22. The mobile device of claim 20 wherein the first information relates to acceleration of the mobile device and the second information relates to velocity of the mobile device.

23. The mobile device of claim 20 further comprising interface means, communicatively coupled to the processing means, for obtaining user settings from a user of the mobile device, wherein the processing means is configured to integrate the first information in accordance with the user settings.

24. A mobile device comprising:
a processor;
a gyroscope communicatively coupled to the processor and configured to sense turn rate of the mobile device; and
monitor means, communicatively coupled to the processor and the gyroscope, for generating first information relating to a motion state anomaly associated with motion of the mobile device;
wherein the processor is configured to cause the gyroscope to transition between an inactive mode and an active mode in response to the first information;
wherein the processor is further configured to utilize at least one of the first information or second information associated with acceleration of the mobile device to determine turn angle of the mobile device while the gyroscope is operating in the inactive mode or transitioning from the inactive mode to the active mode.

25. The mobile device of claim 24 wherein the monitor means is configured to provide third information upon determining that the mobile device is not rotating, and the processor is configured to cause the gyroscope to transition from the active mode to the inactive mode in response to the third information.

26. The mobile device of claim 24 wherein the monitor means is configured to provide the first information upon detecting a magnetic anomaly causing magnetometer performance degradation in the mobile device, and the processor is configured to cause the gyroscope to transition from the inactive mode to the active mode in response to the first information.

27. A computer program product residing on a non-transitory processor-readable medium and comprising processor-readable instructions configured to cause a processor to:

obtain first indications of sensed motion of a device corresponding to an associated motion sensor;

integrate the first indications to obtain integrated motion information;

generate second indications of the integrated motion information; and provide, to a disparate processing unit, selective ones of the second indications;

wherein the first indications are integrated at a first rate and the selective ones of the second indications are provided to the disparate processing unit at a second rate that is slower than the first rate.

28. The computer program product of claim 27 wherein the first indications are indications of turn rate and the second indications are indications of turn angle.

29. The computer program product of claim 27 wherein the first indications are indications of acceleration and the second indications are indications of velocity.

30. A computer program product residing on a non-transitory processor-readable medium and comprising processor-readable instructions configured to cause a processor to:

obtain a first indication of a motion state anomaly associated with motion of a mobile device;

instruct transition of a gyroscope associated with the mobile device between a first mode and a second mode in response to the first indication; and determine turn angle of the mobile device while the gyroscope transitions from the first mode to the second mode based on at least one of the first indication or a second indication associated with sensed acceleration of the mobile device;

wherein the first mode is a reduced-power mode compared to the second mode.

31. The computer program product of claim 30 wherein the processor-readable instructions are further configured to cause the processor to obtain a third indication upon determining that the mobile device is not rotating, and the processor-readable instructions configured to cause a processor to instruct transition of the gyroscope comprise processor-readable instructions configured to cause the processor to instruct transition of the gyroscope from the second mode to the first mode in response to the third indication.

32. The computer program product of claim 30 wherein the processor-readable instructions configured to cause a processor to obtain the first indication comprise processor-readable instructions configured to cause the processor to obtain the first indication upon detecting a magnetic anomaly causing magnetometer performance degradation in the mobile device, and the processor-readable instructions configured to cause a processor to instruct transition of the gyroscope comprise processor-readable instructions configured to cause the processor to instruct transition of the gyroscope from the first mode to the second mode in response to the first indication.

* * * * *